Feb. 14, 1956 W. B. MORRIS 2,734,740
TWO-STAGE PRELOADED SPRING CARTRIDGE
Filed Feb. 19, 1953 2 Sheets-Sheet 1

INVENTOR:
Willis B. Morris
By
His Patent Attorneys

Feb. 14, 1956  W. B. MORRIS  2,734,740
TWO-STAGE PRELOADED SPRING CARTRIDGE
Filed Feb. 19, 1953  2 Sheets-Sheet 2
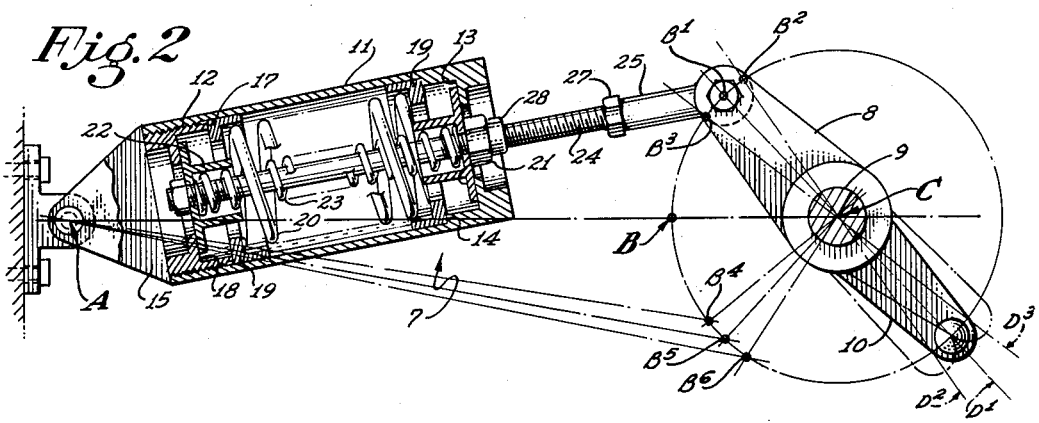
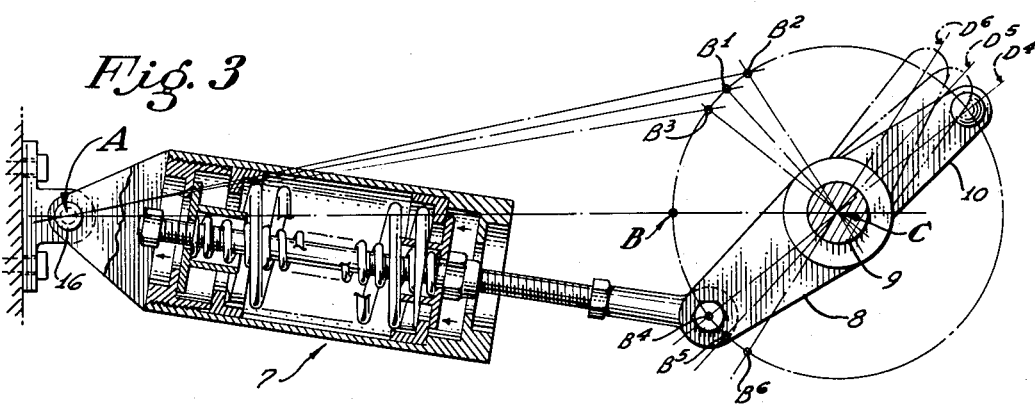
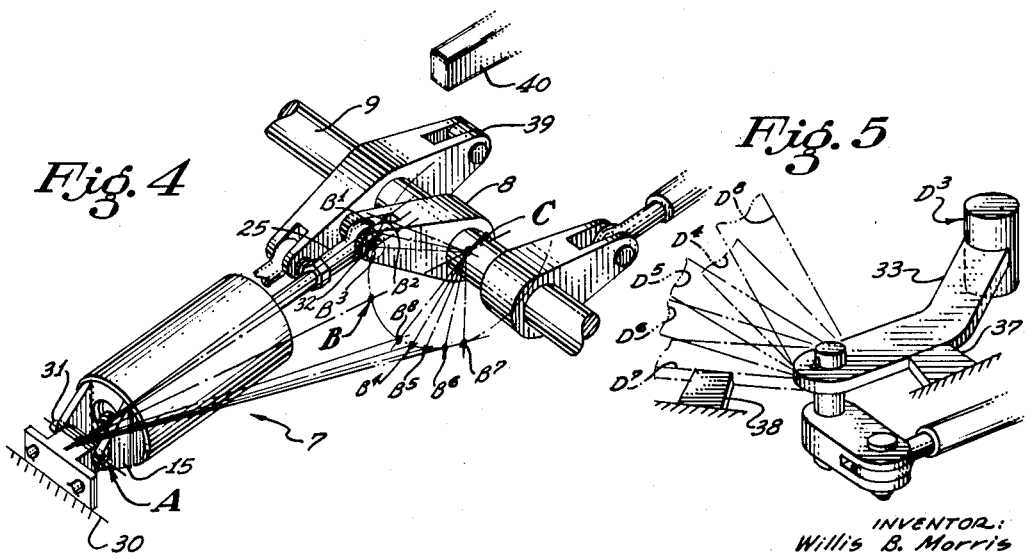
INVENTOR:
Willis B. Morris
By Herbert E. Metcalf
His Patent Attorney

United States Patent Office 2,734,740
Patented Feb. 14, 1956

2,734,740

TWO-STAGE PRELOADED SPRING CARTRIDGE

Willis B. Morris, Hawthorne, Calif., assignor to Northrop Aircraft, Inc., Hawthorne, Calif., a corporation of California Application February 19, 1953, Serial No. 337,797

6 Claims. (Cl. 267—1)

This invention relates to a positioning device and more particularly to a two stage preloaded spring cartridge providing an associated control lever or the like with a plurality of positions which may be located by an operator by feel.

A two stage preloaded spring cartridge, of the type shown and disclosed in the present invention, may be utilized to provide the operator of an airplane with a plurality of canopy control lever positions which may be located by his sense of touch, the canopy control lever positions corresponding to predetermined positions of the canopy. Thus the canopy of an airplane may be raised to its full up position, lowered to its full down position, or moved to a predetermined intermediate position without the operator visually observing the position of the canopy or canopy controls. For example, for better visibility the canopy may be partially opened while a plane is being taxied without the operator visually observing the position of the canopy controls, thus the operator is free for other and equally important observations which may require his attention.

The preloaded spring cartridge also maintains the canopy controls in certain positions until they are acted upon by a plane's operator and further assists the operator in moving the controls between certain of their positions as will be apparent as the disclosure progresses.

It is an object of the present invention to provide a preloaded spring cartridge having a neutral preloaded position and a plurality of non-neutral positions, the neutral preloaded position and non-neutral positions being perceptible to an operator's sense of touch if transmitted to control elements of a device with which the cartridge is associated.

Another object is to provide a preloaded spring cartridge adapted to maintain control elements of a device with which the cartridge is associated in certain positions until acted upon by the operator.

Another object is to provide a preloaded spring cartridge adapted to move control elements of a device with which it is associated from certain given position to other positions or at least assist the operator in moving the controls between these positions.

These and other objects will become apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Figure 2 is a sectional view of the preloaded spring cartridge, as shown in Figure 1, in a neutral preloaded position together with associated parts.

Figure 3 is a sectional view of the preloaded spring cartridge, as shown in Figure 1, in a non-neutral position together with associated parts.

Figure 4 is an enlarged perspective view of the preloaded spring cartridge and attached parts enclosed in the area indicated at A in Figure 1.

Figure 5 is an enlarged perspective view of the operator's canopy control lever and attached parts enclosed in the area indicated at B in Figure 1.

Figure 1:
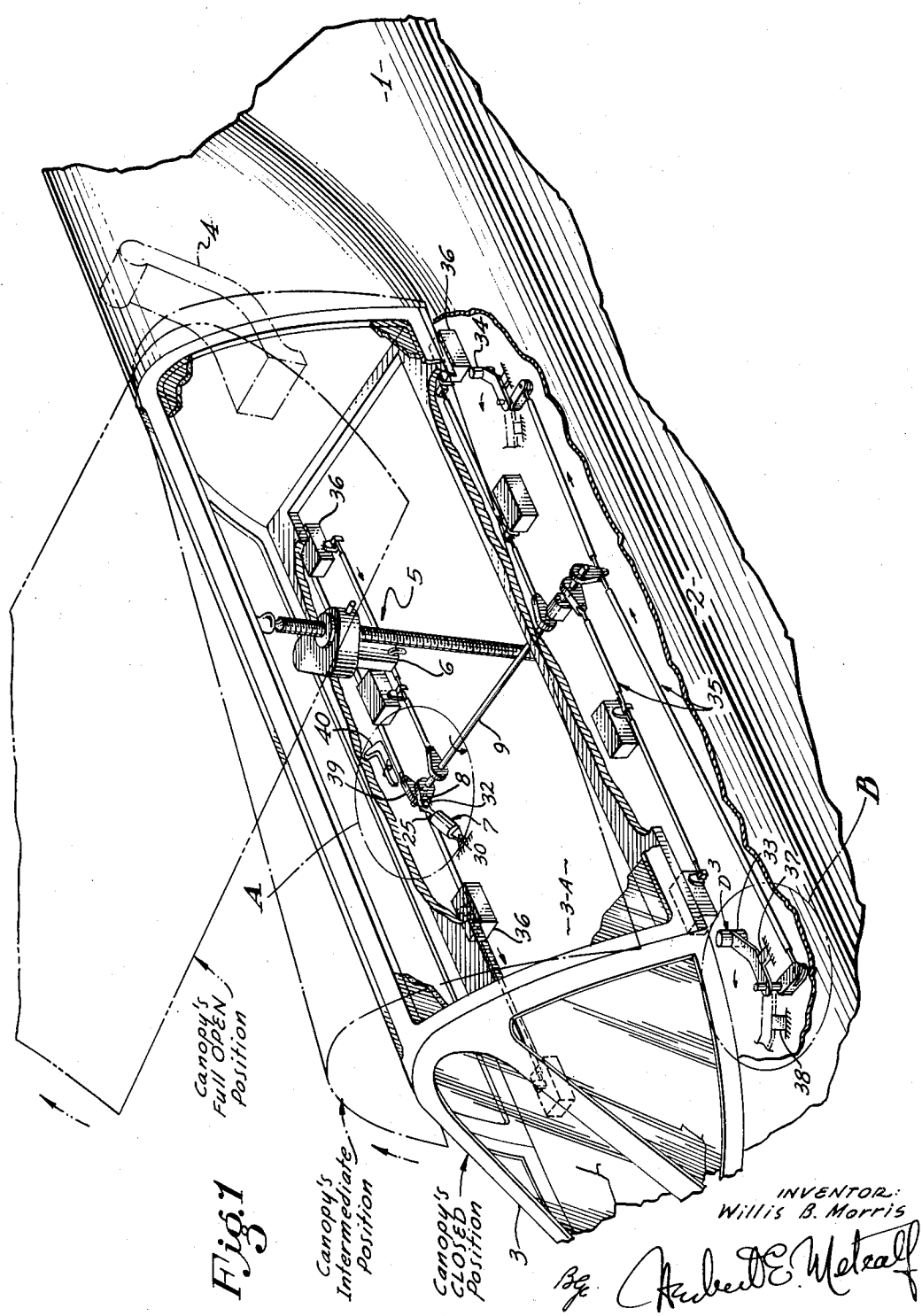
Figure 1 is a fragmentary perspective view of an airplane showing the preloaded spring cartridge, of the present invention, attached to the canopy controls.

Referring to Figure 1 a fragmentary portion of an airplane 1 is shown having a cockpit 2 accommodating two operators, viz., a pilot and radar operator, a windshield 3, and a canopy 3A adapted to close the cockpit. The canopy is mounted on the plane by means of a pivotal attach member 4 located adjacent the aft end of the canopy and a resilient mounting-actuating assembly 5 located at approximately the canopy's mid-point. The mounting actuating assembly may be of the type disclosed and claimed in copending application Serial No. 334,294, dated January 30, 1953.

The canopy in its full open position, shown by phantom construction in Figure 1, permits the pilot and radar operator to enter or leave the plane's cockpit. The canopy is raised to its full open position by energizing a reversible actuator 6 associated with the mounting-actuating assembly, the canopy pivoting about the attach member 4. In addition to the canopy's fully open and closed positions it is equally important that it has an intermediate position where it comes to rest during either its opening or closing operation. The two stage spring cartridge 7 enables the pilot to recognize the positions of the canopy controls corresponding to the above canopy positions by feel in a manner presently explained. The desired intermediate position of the canopy is such that it allows unobstructed pilot vision, i. e., the pilot is able to look between the windshield and the forward part of the canopy in this position.

Availability of a canopy position intermediate its full up and down positions is utilized during the period a plane is taxiing soon after flying at high altitudes. Under such conditions the windshield and canopy normally fog over due to the temperature differential between the air in the cockpit and ambient atmospheric air. Under these conditions the pilot's visibility is zero and it is imperative the canopy be raised slightly to provide visibility and allow the two temperatures to equalize. The intermediate position is also advantageous as the canopy is lowered as it notifies the pilot and radar operator that the canopy is about to be lowered into its seating position with the cockpit, this allows the operators sufficient time to clear any portion of their body or other articles which may be damaged or interfere with the canopy properly seating itself.

For a clear understanding of how the spring cartridge enables the pilot to locate (feel) various positions of the canopy controls a description of the cartridge's construction and operation follows.

As shown in Figures 2 and 3, the cartridge 7 is pivotally secured to a non-movable structural element adjacent one of its ends, its other end is pivotally attached to an arm 8, the arm being keyed to a shaft 9 rotatable by means of a lever 10. The spring cartridge 7 comprises a cylindrical sleeve member 11 having internal threads 12 adjacent one end and provided with a pair of longitudinally spaced annular internal shoulders 13 and 14 at its other end, shoulder 13 being of less diameter than shoulder 14 and being located nearer the end of the sleeve member. An attaching element 15 is provided with an eye 16 at one of its ends, its other end threadably engages the internal threads 12 of the sleeve member. The end portion 17 of element 15 and an annular shoulder 18 provides bearing surfaces which are equal in diameter and longitudinally spaced the same as the bearing surfaces of shoulders 14 and 13, respectively. Identical rings 19 contact shoulder 14 and the end portion 17 of element 15 in the neutral preloaded position of cartridge 7, as best seen in Figure 2, and retain a precompressed helical spring 20 therebetween. A pair of elements 21 and 22, substantially U-shaped in cross section, are provided with annular extending shoulders adjacent their base portions, the shoulders being of greater outside diameter than the inside diameter of shoulders 13 and 18. The shoulders of elements 21 and 22 contact shoulders 13 and 18 in the neutral preloaded position of the cartridge and also retain a precompressed helical spring 23 of less diameter than spring 20. The head portion of a bolt 24 contacts element 22 located adjacent shoulder 18, its shank portion passes through apertures in elements 21 and 22 and extends from the end of sleeve member 11 a suitable distance. Secured to the end of bolt 24 is an attach element 25 provided with an eye, the relative position of the bolt and attach element is maintained by a jam nut 27. An elastic stop nut 28 is positioned on the shank of the bolt 24 and adjusted so the head of the bolt and nut contact the outer surfaces of elements 21 and 22 when the latter are in contacting relationship with shoulders 13 and 18. Clearance is provided between the sleeve member 11, rings 19, elements 21 and 22, and the shank of bolt 24 so that any of these parts may freely move longitudinally with respects to each other without affecting the position of the other parts.

The cartridge 7, rigged as shown and disclosed in Figures 2 and 3, enables an operator to locate the lever 10 at six distinct positions perceptible to his sense of feel. In Figure 2 springs 20 and 23 are expanded the maximum amount allowed by the cartridge, the center line of the cartridge 7 and arm 8 are indicated by the lines $AB^1$—$B^1C$, the corresponding position of the lever 10 is indicated at $D^1$. These positions may be referred to as a first neutral position of lever 10 and neutral preloaded position of cartridge 7. If the lever is rotated in a clockwise direction from its position indicated at $D^1$ to a position indicated at $D^2$, bolt 24 and element 22 will move to the right opposed by the force exerted by preloaded spring 23. As the shoulder of element 22 contacts ring 19 the force exerted by preloaded spring 20 must be overcome if lever 10 is to be rotated further in a clockwise direction. This position of lever 10 ($D^2$) constitutes a non-neutral position. If the lever 10 is now rotated in a counter-clockwise direction from the position indicated at $D^2$ to the position indicated at $D^3$, another non-neutral position is perceptible. During this movement the cartridge 7 moves through its neutral preloaded position, further counter-clockwise motion is opposed by preloaded spring 23 acting against element 21. As the shoulder of element 21 contacts ring 19 the force exerted by preloaded spring 20 must be overcome if lever 10 is to be rotated further in a counter-clockwise direction, this constitutes another non-neutral position ($D^3$) of the lever. Should the operator release lever 10 while in non-neutral positions $D^2$ or $D^3$ it is apparent preloaded spring 23 will automatically return it to its first neutral position ($D^1$).

From the above it is apparent the cartridge provides the lever 10 with a second set of three positions, corresponding to those just described, should the lever 10 be rotated in a counter-clockwise direction causing cartridge 7 and arm 8 to move through their dead center position indicated by the line ABC. The relative relation of component parts of the cartridge for the lever's non-neutral position $D^4$ is shown in Figure 3, the center line of the cartridge and arm are indicated by lines $AB^4$—$B^4C$. The neutral and non-neutral positions of the lever are indicated at $D^5$ and $D^6$, corresponding positions of the cartridge and arm are indicated by lines $AB^5$—$B^5C$ and $AB^6$—$B^6C$, respectively. Inasmuch as the positions of the cartridge 7, arm 8, and lever 10, located below the dead center position of the cartridge and arm, correspond and are located in an identical manner with those above the dead center position (ABC) they will not be described in detail.

The force exerted by preloaded springs 20 and 23, in their fully expanded but preloaded positions as shown in Figure 2, may be of any magnitude desired to provide readily discernible positions for lever 10. In the embodiment to be presently described, in which the preloaded springs are utilized to provide positions for the canopy controls of an airplane, a satisfactory preload for spring 23 is 2½ times the force required to overcome the frictional resistance of the component part of the system, the preload of spring 20 being approximately 2½ times the force required to overcome the frictional resistance of the system plus the force exerted by spring 23 at the time either element 21 or 22 contact one of the rings 19. These definite forces must be overcome before the component parts of the cartridge 7 can be moved from their neutral preloaded position or beyond their non-neutral positions, as described above, and provides an associated control with definite positions discernible to an operator by touch.

Although the cartridge as disclosed above utilizes only two springs which provides the lever 10 with two neutral positions and four non-neutral positions it is to be understood that additional springs may be added. The use of each additional spring will provide the lever 10 with four additional non-neutral positions in the same manner as the non-neutral positions provided by preloaded spring 20.

While the cartridge 7, as disclosed above, provides an associated control lever with two neutral and four non-neutral positions, not all six positions are utilized in connection with the canopy controls of Figure 1. Referring again to Figure 1 the cartridge is pivotally secured to a fixed structural element 30 of the plane by means of a suitable pin 31 supported by the element and passing through eye 16 of attach element 15. The cartridge's other attach element 25 is pivotally attached to an arm 8 by means of a suitable pin 32. The arm 8 is keyed to a shaft 9 which is pivotally supported by suitable bearings (not shown) and extends transversely of the plane's cockpit at approximately its mid-point. Rotational movement is imparted to the shaft by means of canopy control levers 33 and 34 capable of rotary movement about a vertical axis by the pilot or radar operator. Rotary movement of the canopy control levers is transmitted to shaft 9 and cartridge 7 by means of a suitable linkage assembly 35. A plurality of locks 36 are utilized to secure the canopy in its fully closed relationship with the cockpit, the locks are also actuated by the canopy control levers and linkage assembly 35. The extreme rotational movement of the control levers is limited by stops 37 and 38. An arm 39 is keyed to the shaft 9 and arrests rotary movement of the shaft under certain conditions upon contacting stop element 40 in a manner presently described.

The canopy is shown in its full down and locked position by solid construction in Figure 1, Figures 4 and 5 show in detail the position of the cartridge and the pilot's control lever 33 corresponding to the full down and locked position of the canopy. The position of lever 33, cartridge 7, and arm 8 for this position is indicated at $D^3$ and $AB^3$—$B^3C$, respectively, in Figures 4 and 5, in this position the relationship of the various parts of the cartridge, arm, etc., is the same as described in connection with Figures 2 and 3 for position $AB^3$—$B^3C$. Position $D^3$ of the lever, however, is located by contacting structural stop 37, it is apparent the lever 33 will be resiliently held in contact with stop 37 until such time as it is moved by the pilot.

To release the locks 36, lever 33 is rotated in a counter-clockwise direction until the cartridge 7 and arm 8 pass through their dead center position indicated by the line ABC. Further effort on the part of the pilot is not normally required to move cartridge, arm, and lever to the positions indicated at $AB^5$—$B^5C$ and $D^5$, respectively, the component parts being urged to this position by preloaded springs 20 and 23. In the position of the lever, indicated at $D^5$, the locks 36 are released.

To raise the canopy to its intermediate position (Figure 1), lever 33 is rotated to the position indicated by $D^6$. This position corresponds to position $D^6$ of lever 10, as shown in Figures 2 and 3, and provides a non-neutral position as is apparent from the description in connection with these figures. The position of cartridge 7 and arm 8 corresponding to position $D^6$ of the lever is indicated by lines $AB^6$—$B^6C$. The movement of the pilot's control lever from $D^5$ to $D^6$ energizes actuator 6 to rotate in a clockwise direction, the canopy accordingly is raised to its intermediate position. A conventional limit switch (not shown) de-energizes actuator 6 which arrests the upward movement of the canopy as it reaches its intermediate position.

To raise the canopy to its full up position (Figure 1), lever 33 is rotated to the position indicated by $D^7$. This position of the lever is located by contacting structural stop 38. The position of the cartridge and arm corresponding to the lever's position $D^7$ is indicated by lines $AB^7$—$B^7C$. The movement of the lever from $D^6$ to $D^7$ energizes actuator 6 to rotate in a clockwise direction, the canopy accordingly is raised to its full up position, a conventional limit switch (not shown) de-energizes the actuator as the canopy reaches its full up position. If lever 33 is released while at positions $D^6$ or $D^7$ it will automatically be returned to position $D^5$ by preloaded springs 20 and 23.

To lower the canopy to its intermediate position, lever 33 is rotated to the position indicated at $D^4$. This position corresponds to position $D^4$ of lever 10 as shown in Figures 2 and 3, it provides a non-neutral position as is apparent from the description of these figures. The position of the cartridge and arm corresponding to the lever's position $D^4$ is indicated by lines $AB^4$—$B^4C$. The movement of the pilot's control lever from position $D^5$ to $D^4$ energizes actuator 6 to rotate in a counter-clockwise direction, the canopy accordingly is lowered to its intermediate position and a conventional limit switch (not shown) de-energizes the actuator at the canopy's intermediate position.

To lower the canopy to its full down position the lever is rotated to the position indicated at $D^8$. This position of lever 33 is located by arm 39 contacting stop 40 which is resiliently urged into the path of arm 39 at such times as the canopy is not in its full down position. The position of the cartridge and arm corresponding to the lever position $D^8$ is indicated by lines $AB^8$—$B^8C$. The movement of the lever from $D^4$ to $D^8$ energizes actuator 6 to rotate in a counter-clockwise direction, the canopy accordingly is lowered to its full down position at which time a conventional limit switch (not shown) de-energizes the actuator. As the canopy positions itself on the cockpit 2 it removes stop element 40 from the path of arm 39. The lever 33 may now be rotated to position $D^3$ in which the locks 36 again secure the canopy, thus the cycle of raising and lowering the canopy is completed.

In the above operation only three positions of lever 33 are provided by the cartridge 7, viz., positions $D^4$, $D^5$ and $D^6$, however, the cartridge provides other advantages. The spring 23 automatically returns the lever from position $D^4$ or $D^6$ to its neutral position $D^5$, the spring 23 resiliently holds the lever in position $D^3$, and both springs aid the pilot in moving the lever between certain of its positions.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Apparatus as described the combination comprising: a spring cartridge including a cylindrical casing, a rod, and spring and stop means in said casing; said rod and casing having relative coaxial and overlapping relationships in which an end of said rod extends from an end of said casing; said spring and stop means being effective to maintain the overlapping relationship of said rod and casing and allow limited relative movement therebetween in an axial direction; said spring and stop means automatically providing said rod with a neutral position relative to said casing in which the amount of relative overlap between said rod and casing is a predetermined amount; said spring and stop means coact to provide a spring assistance to movement of said rod in either direction from said neutral position and first and second non-neutral positions in which the movement of said rod in either direction from said neutral position is resisted by an abrupt change in spring resistance; a mounting structure; a shaft mounted for angular movement on said structure and having a radially extending arm keyed thereto; the end of said casing, opposite the end from which said rod extends, being attached to said structure to pivot about an axis parallel to the axis of said shaft; the extending end of said rod being pivotally attached to said arm whereby opposite angular movement of said arm results in bidirectional axial movement of said rod relative to said casing and provides said shaft with first and second neutral angular positions and four non-neutral angular positions determined by the neutral and non-neutral positions of said rod.

2. Apparatus as set forth in claim 1: further characterized in that the common pivotal axis of said rod and arm is located on opposite sides of the common plane in which the pivotal axis of said shaft and casing extend at such times as said shaft is in the said first and second neutral angular positions, respectively; said non-neutral positions of said shaft occurring when the latter is angularly moved in either direction a given amount from the first and second neutral angular positions thereof.

3. Apparatus as set forth in claim 2: further characterized in that said spring and stop means allows said rod to move axially from the neutral position thereof, in a direction to increase the overlapping relationship of said rod and casing, a distance which exceeds the arc through which the common pivotal axis of said rod and arm travels when projected on said common plane as a result of said shaft moving between said first and second neutral angular positions.

4. Apparatus as described the combination comprising: a spring cartridge including a tubular casing having four spaced annular fixed stops having coaxial relationship formed in the inner wall thereof; two annular inner movable stops coaxially arranged with respect to said fixed stops and normally contacting the two innermost fixed stops, respectively; a precompressed coil spring extending between said inner movable stops; two annular outer movable stops coaxially arranged with respect to said fixed stops and normally contacting the two outermost fixed stops, respectively; a precompressed coil spring extending between said outer movable stops; a rod having an overlapping relation with said casing and slidably extending through the apertures in all of said movable stops; spaced means on said rod in contact with each of said outer movable stops, respectively, at such time as each of the latter stops is in contact with said respective outermost fixed stops whereby said rod is located in a neutral position; the inside diameter of said inner movable stops being smaller than the outside diameter of said outer movable stops; said rod having first and second non-neutral positions occurring at such times as said rod is moved in opposite axial directions from the neutral position thereof and a respective one of said outer movable stops is moved into contact with an adjacent one of said inner movable stops; a mounting structure; a shaft mounted for angular movement on said structure and having a radially extending arm keyed thereto; the extending end of said rod being pivotally attached to said arm; the end of said casing, opposite the end from which said rod extends, being attached to said structure to pivot about an axis parallel to the axis of said shaft; opposite angular movement of said arm resulting in bidirectional axial movement of said rod with respect to said casing to provide said shaft with first and second neutral angular positions and four non-neutral angular positions determined by the neutral and non-neutral positions of said rod.

5. Apparatus as set forth in claim 4: further characterized in that the common pivotal axis of said rod and arm is located on opposite sides of the common plane in which the pivotal axes of said shaft and casing extend at such times as said shaft is in the said first and second neutral angular positions, respectively; said non-neutral positions of said shaft occurring when the latter is angularly moved in either direction a given amount from the first and second neutral angular positions thereof.

6. Apparatus as set forth in claim 5: further characterized in that the distance between said inner movable stops when in contact with respective innermost fixed stops exceeds the arc through which the common pivotal axis of said rod and arm travels when projected on said plane as a result of said shaft moving between said first and second neutral angular positions.

References Cited in the file of this patent

UNITED STATES PATENTS

| | | |
|---|---|---|
| 1,057,929 | Burdette | Apr. 1, 1913 |
| 1,997,170 | Egan | Apr. 9, 1935 |
| 2,186,653 | Penote | Jan. 9, 1940 |
| 2,402,400 | Hewitt et al. | June 18, 1946 |